US006978076B2

(12) United States Patent
Kishida et al.

(10) Patent No.: US 6,978,076 B2
(45) Date of Patent: Dec. 20, 2005

(54) VARIABLE OPTICAL ATTENUATOR

(75) Inventors: Toshiya Kishida, Kawasaki (JP); Takashi Yamane, Kawasaki (JP); Tatsuro Kunikane, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 110 days.

(21) Appl. No.: 10/727,671

(22) Filed: Dec. 5, 2003

(65) Prior Publication Data

US 2004/0141710 A1 Jul. 22, 2004

(30) Foreign Application Priority Data

Jan. 20, 2003 (JP) ............................ 2003-011424

(51) Int. Cl.[7] ................................................ G02B 6/00
(52) U.S. Cl. ........................................ 385/140; 385/14
(58) Field of Search .................................. 385/140, 14

(56) References Cited

U.S. PATENT DOCUMENTS 5,727,109 A * 3/1998 Pan et al. .................. 385/140
6,055,104 A * 4/2000 Cheng ........................ 359/495
6,282,361 B1 8/2001 Nishimura et al. ........... 385/40
6,781,736 B2 * 8/2004 Hoyt et al. ................. 359/256

FOREIGN PATENT DOCUMENTS

JP 63201815 8/1988
JP 2000-180803 6/2000

* cited by examiner

*Primary Examiner*—John D. Lee
*Assistant Examiner*—James D. Stein
(74) *Attorney, Agent, or Firm*—Staas & Halsey LLP

(57) ABSTRACT

A variable optical attenuator is constituted of input/output optical systems, a birefringent member provided at output sides of the input/output optical systems, a liquid-crystal member capable of individually varying polarizing states of input beams exiting the birefringent member, and a reflection member which reflects light passing through the liquid-crystal member, to thereby cause the light to return to an output lens of the input/output optical systems by way of the liquid-crystal member and the birefringent member. Thus, there can be provided a variable optical attenuator which is more compact and less expensive than a related-art variable optical attenuator.

34 Claims, 13 Drawing Sheets

VARIABLE OPTICAL ATTENUATOR

BACKGROUND OF THE INVENTION (1) Field of the Invention

The present invention relates to a variable optical attenuator, and more particularly, to a variable optical attenuator capable of changing output optical power by means of varying the magnitude of optical coupling existing between input and output optical fibers through control of the polarizing state of light.

(2) Description of the Related Art

In association with an increase in the traffic over the Internet, the need to increase the capacity of optical communication has recently become urgent. One of the measures for increasing the capacity of optical communication is to increase a bit rate, and another measure is to employ wavelength division multiplexing (WDM). Prompt realization of an optical device which constitutes such a system is desired.

Here, WDM transmission is a technique for transmitting a plurality of wavelengths over a single optical transmission line (e.g., an optical fiber), wherein data are transferred at respective wavelengths, to thereby increase the capacity of communication. However, when data are transmitted through the optical fiber, propagation loss differs from one wavelength to another, and after transmission over a long distance changes arise in optical levels of the respective wavelengths.

When a branch device or an erbium-doped fiber (EDF) amplifier is used in the optical transmission line, this phenomenon becomes more noticeable. For this reason, optical levels at respective wavelengths must be made constant before optical transmission is performed. A solution for this is a technique (called "pre-emphasis") for controlling an optical output achieved at the time of transmission beforehand such that an optical level achieved after transmission becomes constant, through use of a variable optical attenuator (hereinafter also called an "optical attenuator"), or the like, which controls levels of individual wavelengths. However, under the assumption that WDM transmission would be performed, optical levels must be set for respective wavelengths (channels). Hence, there must be provided an optical attenuator capable of varying optical power on a per-channel basis.

However, under present circumstance, there are many cases where optical attenuators are provided on a per-channel basis, thereby rendering devices, such as optical repeaters, bulky and incurring a cost hike. A technique described in Patent Publication 1 has hitherto been proposed as a measure for making the device compact. Specifically, as shown in FIGS. 16A and 16B, development has been pursued to constitute, as a single device, an optical attenuator capable of varying individual optical power levels of a plurality of channels through use of an optical waveguide device of planar type (or a planar lightwave circuit: PLC) 100. FIG. 16A is a top view of the optical attenuator, and FIG. 16B is a side view of the optical attenuator.

In the optical attenuator shown in FIGS. 16A and 16B, tape fibers (each being formed into a tape by stranding a plurality of optical fibers) 200 are connected to mutually-opposing input and output sections of the PLC 100 within a package (housing) 400. A desired voltage is applied, by way of electrical terminals 300, to electrodes provided in equal number to channels within the PCL 100, thereby changing the refractive index of a waveguide on a per-channel basis in order to change optical power.

Patent Publication 2 describes a conventional "handwritten input display device" which enables handwritten input and display of an image and a character by means of utilizing a phenomenon of changing a polarizing state of light through control of arrangement of liquid-crystal molecules.

[Patent Publication 1] JP-A-2000-180803

[Patent Publication 2] JP-A-63-201815

However, the above-described planar lightwave device 100 usually requires micromachining of a quartz substrate through reactive ion etching (RIE) or like processing, thus incurring costs. Further, sufficient miniaturization of the lightwave device cannot be said to have been achieved, for reasons of a limitation on the micromachining technique.

SUMMARY OF THE INVENTION

The invention has been conceived in view of the problem and aims at providing a variable optical attenuator which is more compact and less expensive than a conventional variable optical attenuator.

To achieve the object, the variable optical attenuator of the invention is characterized by comprising the following elements.

(1) an input/output optical system to which are connected a plurality of input optical fibers and a plurality of output optical fibers and which has a plurality of input lenses for taking beams having entered by way of the input optical fibers as input beams and a plurality of output lenses for gathering output beams to be coupled to the output optical fibers, to thereby couple the output beams to the output optical fibers;

(2) a birefringent device provided on an output side of the input/output optical system;

(3) a liquid crystal device capable of changing polarizing states of the input beams exiting the birefringent device; and (4) a reflection device which reflects beams passing through the liquid-crystal device so as to return the beams to the output lens of the input/output optical system by way of the liquid-crystal device and the birefringent device.

Here, the input/output optical system, the birefringent device, the liquid-crystal device, and the reflection device are preferably integrated together.

The input/output optical system preferably comprises a fiber array block, in which a plurality of the input optical fibers are arranged and connected in the form of an array and a plurality of the output optical fibers are arranged and connected in the form of an array and in the same direction as that in which the input optical fibers are arranged; and a lens array block, in which a plurality of the input lenses are arranged in the form of an array in accordance with the arrangement of the input optical fibers in the input array fiber block and in which a plurality of the output lenses are arranged in the form of an array in accordance with the arrangement of the output optical fibers in the output array fiber block.

The liquid-crystal device may preferably have a plurality of sets, each set comprising liquid crystal and electrodes to be used for applying an electric field to the liquid crystal, for controlling polarizing states of different polarizing components of the input light separated by the birefringent device on a per-polarizing-component basis.

A variable optical attenuator according to another embodiment of the invention has the following devices:

(1) an input optical system to which a plurality of input optical fibers are connected and which has a plurality of input lenses taking beams exiting from the input optical fibers as input beams;

(2) a first birefringent device provided on an output side of the input optical system;

(3) a liquid-crystal device capable of varying polarizing state of input beams exiting the first birefringent device;

(4) a second birefringent device provided on an output side of the liquid-crystal device; and (5) an output optical system to which a plurality of output optical fibers are connected and which has a plurality of output lenses for gathering output light exiting the second birefringent device and coupling the gathered output light to an output optical fiber.

The variable optical attenuator of the invention yields the following advantages:

(1) Input beams are caused to reciprocally pass through the birefringent device and the liquid-crystal device between a plurality of input optical fibers and a plurality of output optical fibers, both being connected to the input/output optical system, through use of the reflection device. Polarizing states of the respective input beams are controlled by means of the liquid-crystal device. The quantity of light coupled to the output optical fiber can be changed freely for respective input beams; that is, on a per-channel basis. A variable optical attenuator compatible with multiple channels can be realized in the form of a compact and inexpensive variable optical attenuator while suppressing an increase in the size of the attenuator and an increase in the area occupied by the attenuator, which would otherwise be caused if the number of channels were increased.

(2) Here, if the input/output optical system, the birefringent device, the liquid-crystal device, and the reflection device are integrated together, the variable optical attenuator can be made much more compact.

(3) Under the assumption that the respective input optical fibers and the respective output optical fibers are arranged and connected in the form of an array by means of a fiber array block and that the respective input and output lenses are arranged in the form of an array according to the arrangement of the optical fibers by means of the lens array block, even when the number of channels has been increased, the attenuator can be collectively configured by forming individual devices into an array. Hence, the cost of the optical attenuator array per channel can be significantly reduced as compared with the related-art optical attenuator array, by means of significantly curtailing the number of components.

(4) Further, if a pitch between the input optical fibers and a pitch between the output optical fibers are set so as to become greater than a pitch between the input lenses and a pitch between the output lenses, an improvement in polarization extinction ratio can be expected. Hence, occurrence of interference between channels can be inhibited.

(5) Under the assumption that the reflection device is formed from a coupler film which permits transmission of a portion of the light exiting the liquid-crystal device and that an input light monitor light-receiving unit for receiving the light having passed through the coupler film is provided on the surface of the coupler film. The power of input light can be monitored, and hence there can be realized a compact, inexpensive variable optical attenuator capable of incorporating an optical monitor function that is indispensable as an optical output variable component.

(6) Under the assumption that there is further provided an output light monitor light-receiving unit for receiving the light not coupled to the output optical fiber as a result of a variation in the polarizing state of the liquid-crystal device from among the beams reflected from the reflection device, the quantity of light attenuation can be monitored. Similarly, there can be realized a compact, inexpensive variable optical attenuator capable of incorporating an optical monitor function that is indispensable as an optical output variable component.

(7) Under that assumption that, in order to control the polarizing states of the liquid-crystal device for each beam exiting the input optical fiber or for different respective polarizing components of the input light separated by the birefringent device, the liquid-crystal device is constituted by comprising a plurality of sets, each set consisting of a piece of liquid crystal and electrodes to be used for applying an electric field to the liquid crystal, the polarizing state of the liquid-crystal device can be controlled on a per-channel basis or for respective polarizing components of different channels, the quantity of light attenuation can be controlled more precisely, and hence an improvement in polarization extinction ratio can be expected.

(8) Further, under the assumption that the liquid-crystal device is formed by comprising liquid-crystal molecules and glass plates to be used for sandwiching the liquid-crystal molecules, and the reflection device is formed on the surface of one of the glass plates, the liquid-crystal device and the reflection device can be integrated together, and hence the variable optical attenuator can be downsized further.

(9) Under the assumption that a prism unit—which reflects a portion of incident light in a direction crossing the direction of an optical axis—is interposed between the fiber array block and the lens array block and that a light-receiving unit for monitoring input and output light which receives the light reflected from the prism unit is provided, the power of input light and/or output light can be monitored. Even in this case, there can be realized a compact, inexpensive variable optical attenuator capable of incorporating an optical monitor function that is indispensable as an optical output variable component.

(10) Further, under the assumption that the light-receiving unit is formed from a photodiode array—in which a plurality of photodiodes, each photodiode having a P electrode on one surface thereof and an N electrode on the other surface thereof, are arranged in an array pattern on a conductive transparent substrate such that the other surfaces come into contact with the transparent substrate—and that a common terminal of the N electrodes of the respective photodiodes are provided on the transparent substrate, there is no necessity for providing an N electrode terminal on a per-N-electrode basis. Hence, the number of wiring units is curtailed, thereby improving efficiency. An attempt can be made to downsize the variable optical attenuator by a great extent.

(11) Under the assumption that the light-receiving unit is formed from a photodiode array, in which a plurality of photodiodes, each having a P electrode on one surface thereof and an N electrode formed around the P electrodes, are arranged in the form of an array on a transparent substrate, a limitation imposed on the materials which can be used for the transparent substrate are mitigated, thereby broadening the range of choice of materials. Therefore, the variable optical attenuator can be made further inexpensive.

(12) Even when the input optical system and the output optical system are constituted individually without use of a reflection device, the variable optical attenuator enables a free change in the amount of light coupled to the output optical fiber on a per-channel basis. Hence, the variable optical attenuator can be realized less expensively than a conventional variable optical attenuator.

DESCRIPTION OF THE PREFERRED EMBODIMENTS

Embodiments of the invention will be described hereinbelow by reference to the drawings.

Figure 1A:
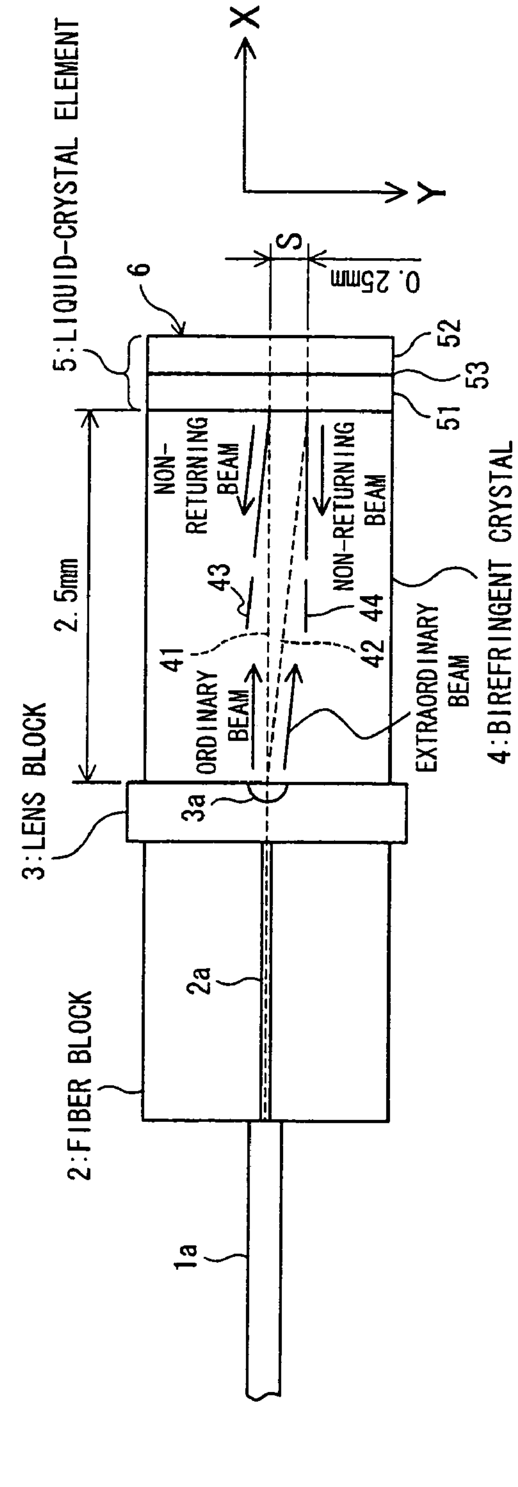
FIG. 1A is a schematic plan view showing the basic configuration of a variable optical attenuator employed as a first embodiment of the invention in conjunction with a lightwave.
Figure 1B:
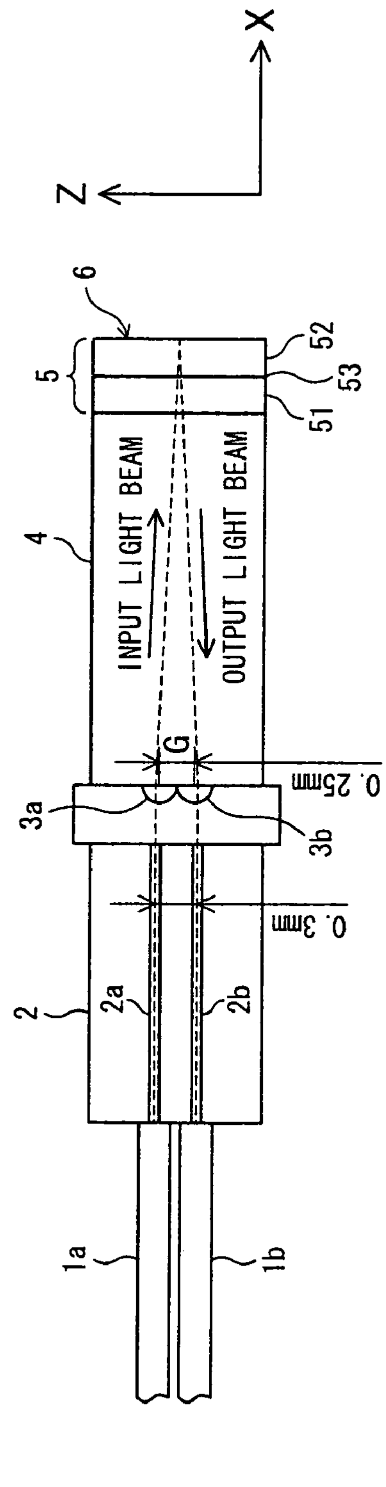
FIG. 1B is a schematic side view of the variable optical attenuator shown in FIG. 1A.

[A] Description of the First Embodiment (A1) Description of the Basic Configuration FIG. 1A is a schematic plan view showing the basic configuration of a variable optical attenuator (hereinafter also called an "optical attenuator") according to a first embodiment of the invention, along with a lightwave; FIG. 1B is a schematic side view of the variable optical attenuator shown in FIG. 1A; and FIG. 2 is a schematic perspective view showing the variable optical attenuator shown in FIGS. 1A and 1B with portions of the attenuator being made transparent.

Figure 2:
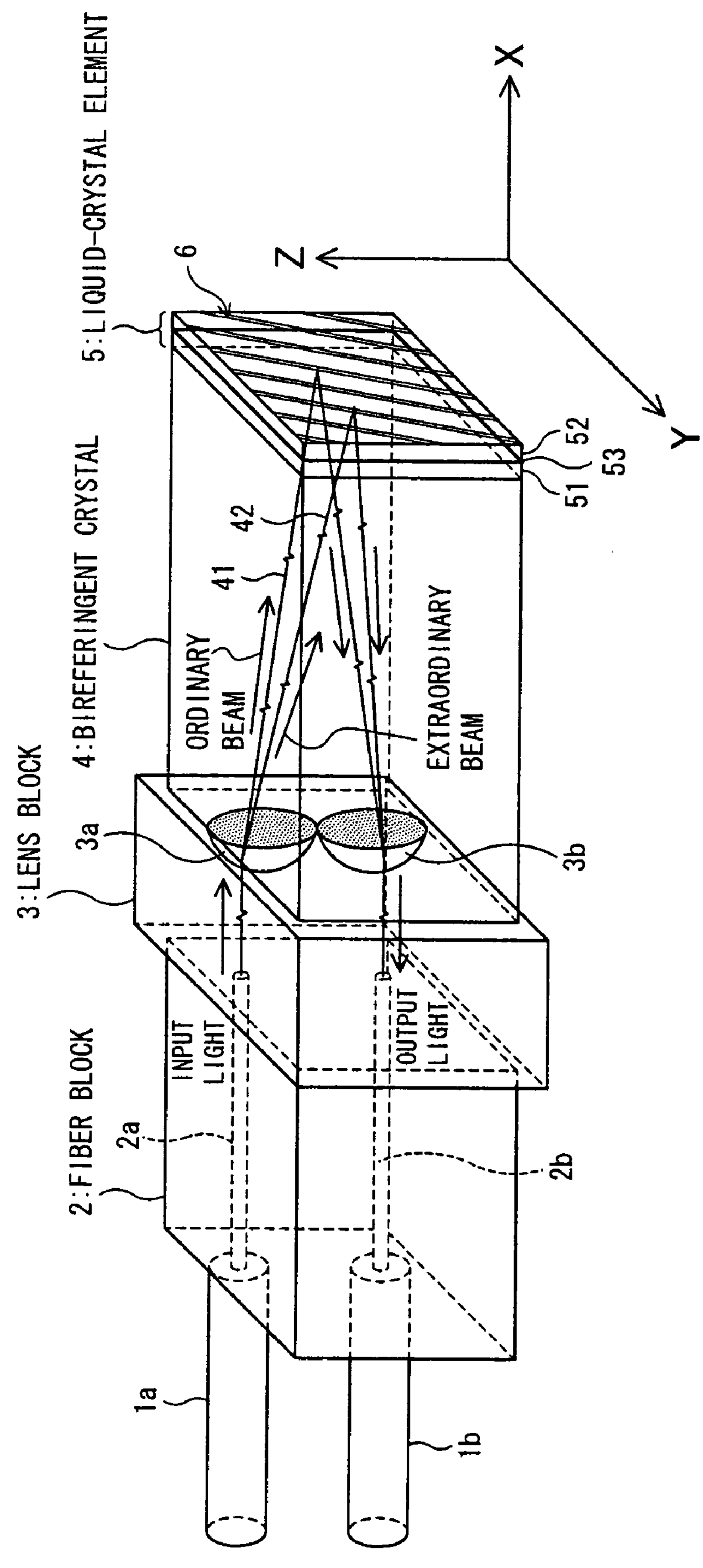
FIG. 2 is a schematic perspective view showing the variable optical attenuator shown in FIGS. 1A and 1B with portions of the attenuator being made transparent.

As shown in FIGS. 1A, 1B, and 2, the optical attenuator of the embodiment is basically constituted of a fiber array block (a fiber-arrayed precision device) 2, a lens array block (a lens-arrayed precision device) 3, a birefringent crystal 4, a liquid-crystal element (a liquid-crystal device) 5, and a reflection element (reflection device) 6. The fiber array block 2, the lens array block 3, the birefringent crystal 4, the liquid-crystal element 5, and the reflection element 6 are integrally arranged without any space therebetween such that input planes of light and output planes of light remain in contact with each other.

Here, an input light fiber 1*a* and an output light fiber 1*b* are connected to the fiber array block (hereinafter also called merely "fiber block") 2 in the same direction (e.g., the direction of the Z axis shown in FIG. 1B). An input lens 3*a* and an output lens 3*b*, which are arranged in the direction of the Z axis such that the optical axes of the lenses are aligned with the optical axes of the respective optical fibers 1*a*, 1*b*, are provided on the lens array block (hereinafter also called simply a "lens block") 3. A collimator lens or a light-gathering lens, which converts input light into collimated light, can be employed as the input lens 3*a* and the output lens 3*b*.

The fiber block 2 is also equipped with an input waveguide (input port) 2*a* for causing the light originating from the core of the input optical fiber 1*a* to propagate to and enter the input lens 3*a* of the lens block 3, and an output waveguide (output port) 2*b* for causing the light originating from the output lens 3*b* to propagate to and enter the core of the output optical fiber 1*b*.

Specifically, the fiber block 2 and the lens block 3 constitute an input/output optical system. In the lens block 3, the input lens 3*a* performs the function of converging into collimated light the light that has entered by way of the input port 2*a*. The output lens 3*b* performs the function of gathering the light reflected from the reflection element 6, which will be described later, and coupling the thus-converged light to the output port 3*b*. As shown in FIG. 1B, when a gap existing between the input lens 3*a* and the output lens 3*b* (i.e., an input/output lens gap) G is taken as 0.25 mm (=250 $\mu$m), the input and output optical fibers 1*a*, 1*b* are fixed such that a gap existing between the optical fibers in the direction of the Z axis (i.e., an input/output fiber gap) "g" assumes a value of about 0.3 mm (300 $\mu$m).

A rutile plate (another crystal may also be usable) which is cut so as to assume an optical axis at an angle of 45°, for example, is used as the birefringent crystal (birefringent member) 4. As shown in FIGS. 1A and 2, if such a rutile plate is used, the light that has entered by way of the input lens 3*a* will be separated into polarized components (an ordinary beam 41 and an extraordinary beam 42) (in the direction of the Y axis), which are polarized orthogonal to each other, while propagating through the rutile plate in the direction of the X axis. In FIG. 1A, the thickness "d" of the rutile plate (i.e., the thickness of the rutile plate in the direction of the X axis) is set to 2.5 mm such that a distance S between the ordinary beam 41 and the extraordinary beam 42 (i.e., a distance between points of reflection in the direction of the Y axis on the reflection element 6), which are separated from each other, assumes a value of 0.25 mm (250 μm).

The liquid-crystal element 5 can change polarizing states of the respective beams (beams) exiting the birefringent crystal 4 (i.e., for the normal beam 41 and the extraordinary beam 42, respectively). The liquid-crystal element 5 has a structure in which liquid crystal 53 is sandwiched between two glass plates 51, 52. There is utilized a phenomenon of a beam having passed through the liquid-crystal element 5 being converted from a linearly-polarized beam to an elliptically-polarized beam, by means of application of an arbitrary electric field between the glass plates 51, 52 so as to change the birefringence of the liquid-crystal element 5. If such a phenomenon can be utilized, the liquid-crystal element 5 may be a commonly-used liquid-crystal element of nematic type or a liquid-crystal element of another type (smectic type).

Figure 3:
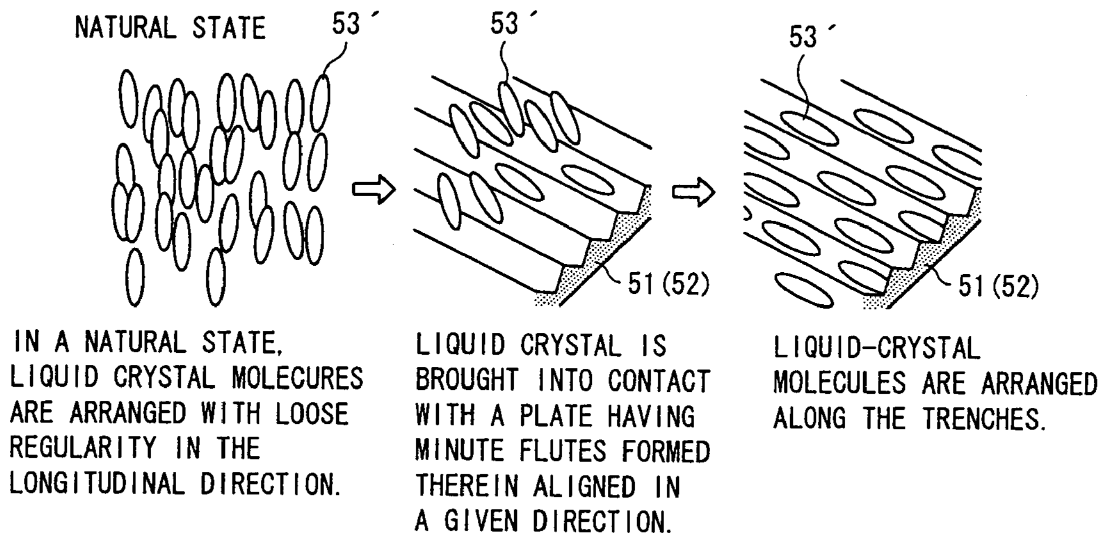
FIG. 3 is a schematic diagram for describing the principle on which a liquid-crystal element of the embodiment operates.
Figure 4:
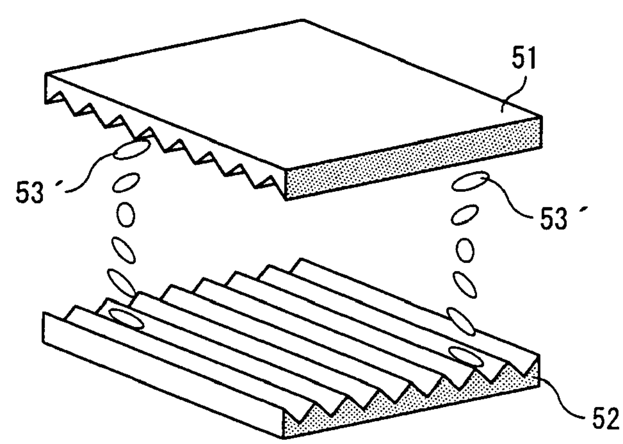
FIG. 4 is a schematic diagram for describing the principle on which a liquid-crystal element of the embodiment operates.

For instance, the structure of the liquid-crystal element 5 of a twisted nematic (TN) type will be described by reference to "Principle of a Liquid-Crystal Display" (see the URL http://www.sharp.co.jp/products/lcd/tech/s2__1.html on the Internet, Sharp Corporation). As schematically shown in FIGS. 3 and 4, the liquid-crystal element 5 has a structure in which molecules 53' of the liquid crystal 53 are sandwiched between the glass plates (orientation films) 51, 52 having trenches engraved therein in given directions while orientations of the trenches of the glass plates are offset from each other by 90°.

By means of such a structure, molecules 53' of the liquid crystal 53 (hereinafter denoted as "liquid-crystal molecules 53') having a loose regularity in the direction of a major axis in a natural state are arranged along the trenches of the respective glass plates 51, 52. Further, the liquid-crystal molecules 53' remaining in contact with the glass plate 51 and the liquid-crystal molecules 53' remaining in contact with the glass plate 52 are twisted from each other by 90° between the glass plates 51, 52.

Figure 5:
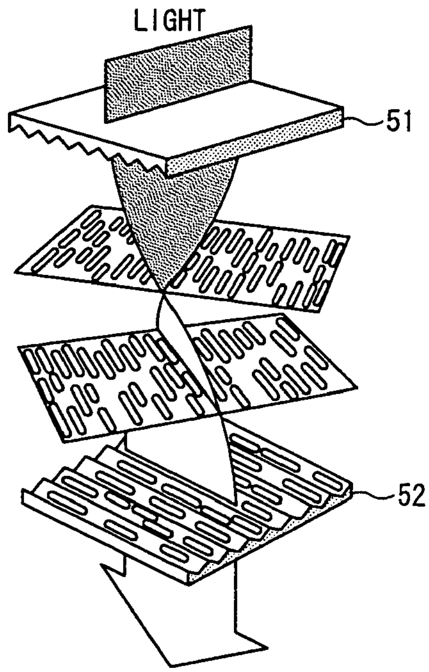
FIG. 5 is a schematic diagram for describing the principle on which a liquid-crystal element of the embodiment operates.
Figure 6:
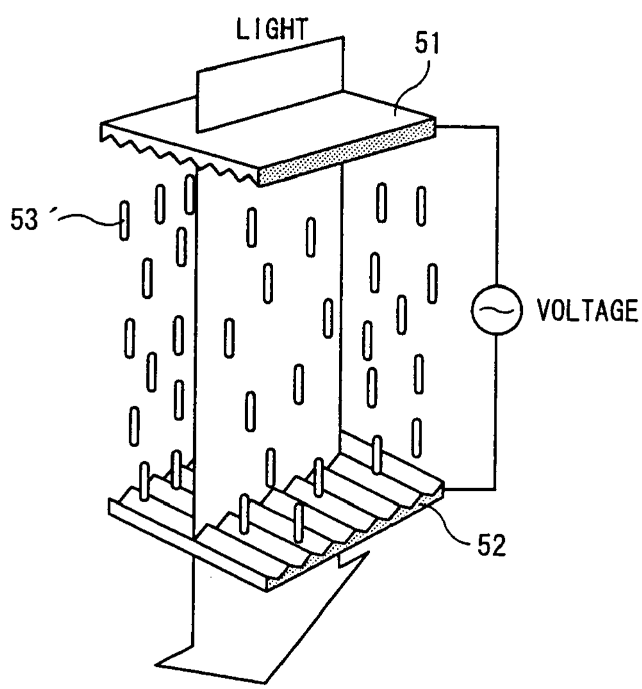
FIG. 6 is a schematic diagram for describing the principle on which a liquid-crystal element of the embodiment operates.

Light travels along a gap between the liquid-crystal molecules 53'. Hence, when the arrangements of the liquid-crystal molecules 53' are twisted, and the light also travels along a twisted path, as schematically shown in FIG. 5 (i.e., a linearly-polarized beam is converted into an elliptically-polarized beam). As schematically shown in FIG. 6, when a voltage is applied between the glass plates 51, 52, the arrangement of the liquid-crystal molecules 53' is changed (i.e., aligned along the electric field) in accordance with the voltage. Hence, light travels in straight lines (i.e., a linearly-polarized beam travels in unmodified form).

On the basis of the above-described principle, the liquid-crystal element 5 can consecutively change the polarizing state of an input beam in accordance with a voltage (i.e., an electric field) applied from the outside. Here, in order to independently change (control) the polarizing state of the ordinary beam 41 and that of the extraordinary beam 42 on a per-beam basis in the same manner as mentioned previously, the liquid-crystal element 5 is configured in, e.g., a manner shown in FIGS. 7A and 7B.

Figure 7B:
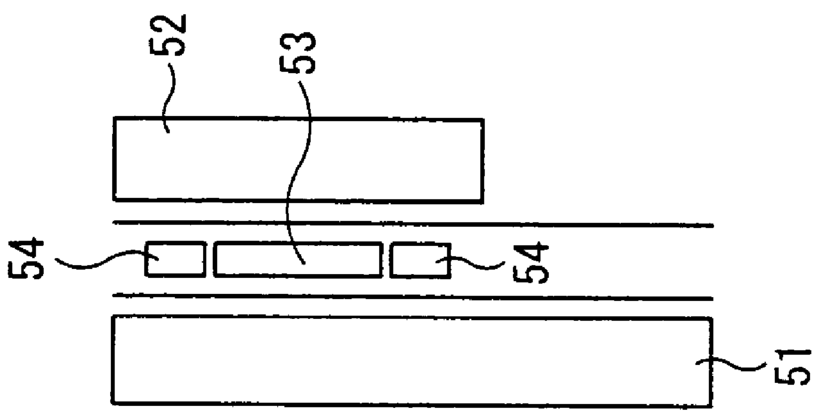
FIG. 7B is a side view of the principal section when viewed in the direction A shown in FIG. 7A.
Figure 7A:
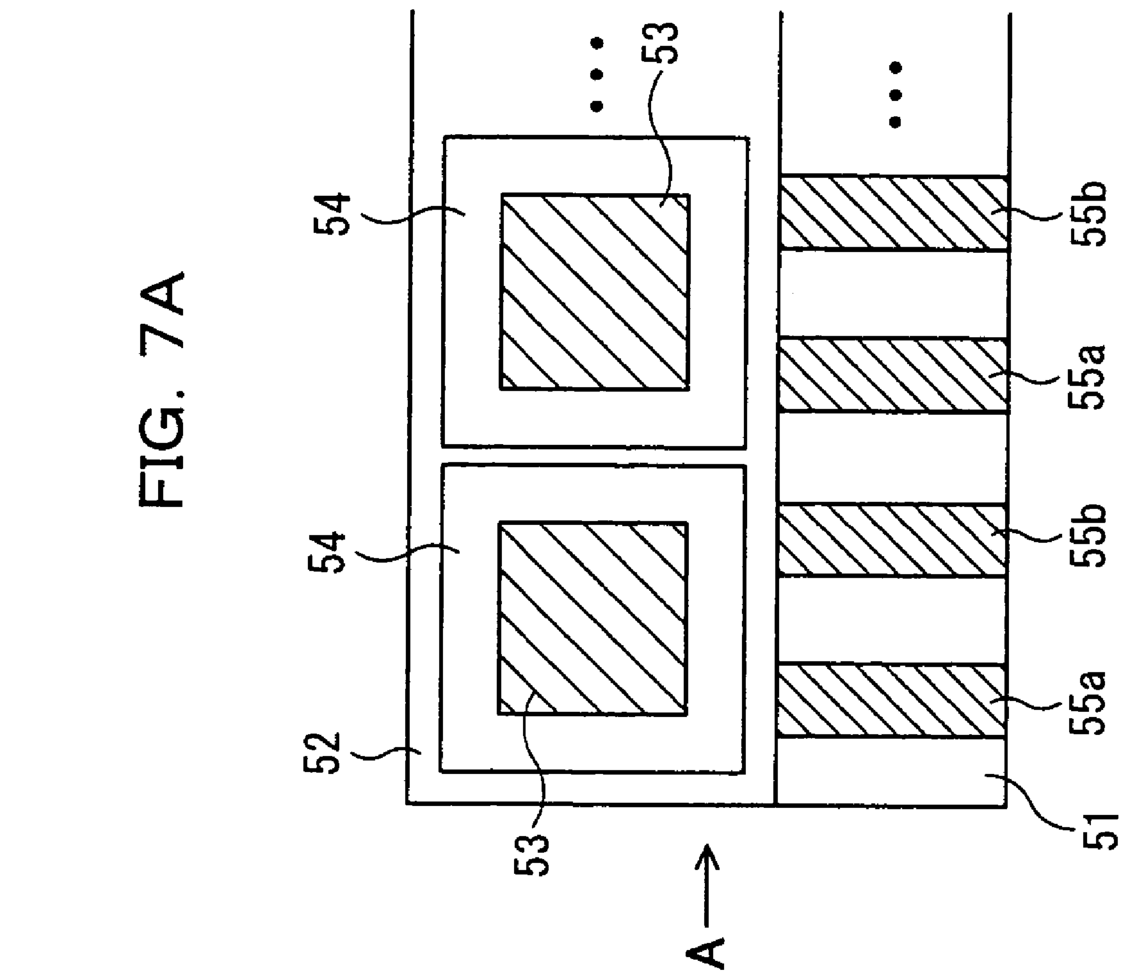
FIG. 7A is a schematic plan view showing the configuration of the principal section of the liquid-crystal element of the embodiment.

FIG. 7A is a schematic plan view showing the configuration of the principal section of the liquid-crystal element 5 of the embodiment; and FIG. 7B is a side view of the principal section when viewed in the direction A shown in FIG. 7A. As shown in FIGS. 7A and 7B, the liquid-crystal 53 partitioned by sealing material 54 constitutes a set in conjunction with transparent (translucent) electrodes 55*a*, 55*b* to be used for applying a voltage (electric field) to the liquid-crystal 53. The set is arranged between the glass plates 51, 52 for the ordinary beam 41 and the extraordinary beam 42 (i.e., for different respective polarization components) independently. For example, an indium-tin oxide (ITO) electrode can be used for the transparent electrodes 55*a*, 55*b*.

However, the set consisting of the liquid crystal 53 and the transparent electrodes 55*a*, 55*b* is not necessarily provided for the ordinary beam 41 and the extraordinary beam 42, respectively. It may be the case that only sets equal in number to input beams—which are not yet separated from each other (i.e., input ports)—are provided as common sets for the ordinary beam 41 and the extraordinary beam 42. However, providing separate sets for the ordinary beam 41 and the extraordinary beam 42 is preferable, because the quantity of light attenuation can be controlled more precisely. Hence, an improvement in polarization extinction ratio can be expected.

The reflection element 6 reflects the light having passed through the liquid-crystal element 5, to thereby introduce the light again into the liquid-crystal element 5 and the birefringent crystal 4. In the embodiment, the reflection element is formed as a total reflection film formed on the plane of light exit of the liquid-crystal element 5 (i.e., the back of the glass plate 52). The total reflection film may be a multilayer dielectric film or a metal film (Al, Au or the like). Here, the reflection element 6 may be provided as an individual device on a stage subsequent to the liquid-crystal element 5. As mentioned above, integrating the reflection element 6 with the liquid-crystal element 5 through formation of a reflection film is advantageous for miniaturization of a variable optical attenuator.

The basic operation of the optical attenuator of the embodiment having the foregoing configuration will now be described. First, the light exiting the upper input optical fiber 1*a* enters the input lens 3*a* provided in the direction of the optical axis after having passed through the input port 2*a*, as well as into the birefringent crystal 4 after having been converted into collimated light by the input lens 3*a*.

The light having entered the birefringent crystal 4 is divided into the ordinary beam 41 and the extraordinary beam 42, and the thus-divided beams enter the liquid-crystal element 5. The liquid-crystal element 5 is provided with the pieces of liquid crystal 53 and the transparent electrodes 55*a*, 55*b*, which are provided for the respective beams as mentioned previously. The pieces of liquid crystal 53 and the transparent electrodes 55*a*, 55*b* can be controlled independently. Hence, the polarizing state of the ordinary beam 41 and that of the extraordinary beam 42, both beams having entered the liquid-crystal element 5, are independently controlled by the corresponding pieces of liquid crystal 53.

As a result, the light having passed through the liquid-crystal element 5 is converted from, e.g., linearly-polarized light into elliptically-polarized light (i.e., a state in which the linearly-polarized light component is merged with a vertically-polarized light component), by means of birefringence of the liquid crystal 53, and enters the reflection element 6 formed on the back of the liquid-crystal element 5.

The light reflected from the reflection element 6 again enters the liquid-crystal element 5. By means of birefringence of a corresponding piece of liquid crystal 53, a change similar to that mentioned previously arises in the polarizing state of light, and the light enters the birefringent crystal 4. Of the beams having entered the birefringent crystal 4, only a component which is identical in polarizing state with the light having entered the birefringent crystal 4 by way of the input lens 3 is finally coupled with the lower output port 2*b* by way of the output lens 3*b*. The light is then output to the output optical fiber 1*b*. As shown in FIG. 1A, other components (beams) 43, 44 do not return to and are not coupled with the output port 2*b*.

Therefore, the arrangement of the liquid-crystal molecules 53' is controlled through control of the voltage applied to the two electrodes 55*a*, 55*b* provided for the respective pieces of liquid crystal 53. Thereby, the polarizing state of the light that travels back and forth within the birefringent crystal 4 and passes through the liquid-crystal element 5 is controlled for each beam input to the liquid-crystal element 5. As a result, the quantity of light coupled to the output port 2*b* (i.e., the output optical fiber 1*b*) can be changed freely on a per-channel basis. Thus, the optical output power can be changed on a per-channel basis.

(A2) Description of a Specific Example

A variable optical attenuator array will now be described hereinbelow as a specific example of the invention on the premise that the array has the foregoing basic configuration.

Figure 8:
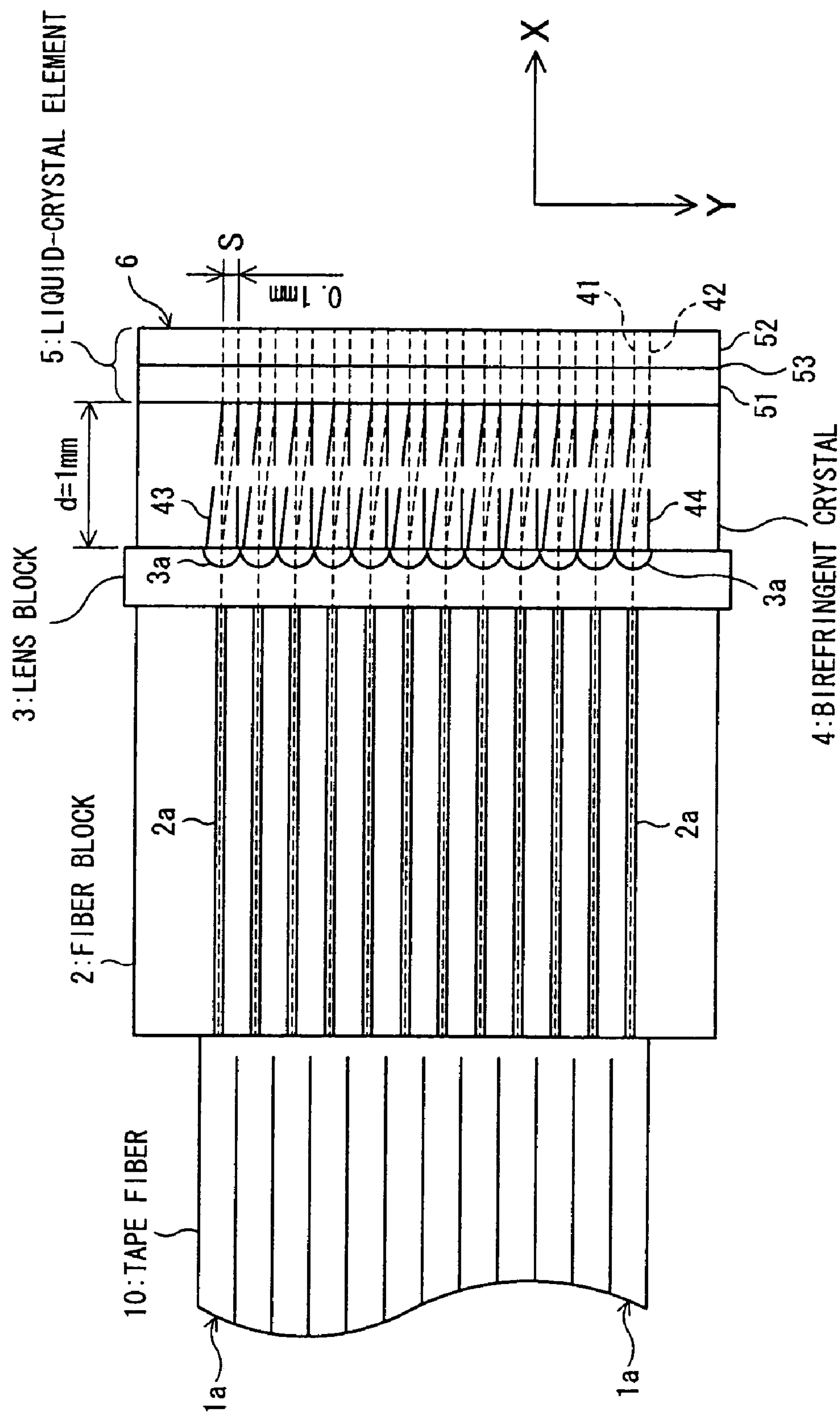
FIG. 8 is a schematic plan view showing the configuration of a variable optical attenuator array for describing a specific example of the variable optical attenuator of the embodiment.

FIG. 8 is a schematic top view showing the configuration of a variable optical attenuator array of the embodiment. The variable optical attenuator array shown in FIG. 8 has a structure in which a multicore tape fiber 10 (including 12 cores)—into which a plurality of input optical fibers 1*a* (twelve input optical fibers in FIG. 8) are aggregated in the form of a tape—is connected to an upper layer section of the fiber block 2 as an input tape fiber.

Although not shown in FIG. 8, an analogous multicore tape fiber (including twelve cores) is connected to a lower layer section of the fiber block 2 as an output tape fiber. Specifically, in the present embodiment, the tape fibers are fixed to the fiber block 2 so as to be stacked on top of each other in two layers in a vertical direction (i.e., a direction identical with the direction of the Z axis shown in FIG. 2) with desired accuracy. An epoxy-based optical adhesive or the like, for instance, is used for fixing the multicore tape fibers (hereinafter also called simply "tape fibers").

The input ports 2*a*—which are equal in number with the cores of the tape fiber 10 (i.e., twelve input ports)—are arranged into an array within an X-Y plane of the upper layer section of the fiber block 2 at an interval between fiber cores of the input tape fiber 10 (e.g., a pitch of 250 $\mu$m). Similarly, the twelve output ports 2*b* are arranged into an array within the X-Y plane of the lower layer section at the pitch between the fiber cores.

Twelve input lenses 3*a* are arranged within the X-Y plane of an upper layer section of the lens block 3 so as to coincide with the optical axes of the respective input ports 2*a*. Twelve output lenses 3*b* are arranged within the X-Y plane of a lower layer section of the lens block 3 so as to coincide with the optical axes of the respective output ports 2*b*.

Specifically, a total of 24 (2×12) ports are arranged into an array within a Y-Z plane in the fiber block 2. Similarly, a total of 24 (2×12) lenses are arranged into an array within the Y-Z plane in the lens block 3 in agreement with the arrangement of the ports in the fiber block 2 (i.e., the arrangement of the input and output optical fibers 1*a*, 1*b*).

The thickness "d" of the birefringent crystal 4 is set to 1 mm such that a distance S between the ordinary beam 41 and the extraordinary beam 42 assumes a value of about 0.1 mm (100 $\mu$m).

As mentioned previously by reference to FIGS. 7A and 7B, the set consisting of the liquid crystal 53 and the transparent electrodes 55*a*, 55*b*, the liquid crystal being partitioned by the sealing material 54, is provided in the liquid-crystal element 5 for the respective ordinary and extraordinary beams 41, 42 of the light having entered by way of the respective input ports 2*a* (i.e., a total of 24 sets).

Even in this case, the only requirement for the liquid-crystal element 5 is to use a single glass plate 51 (or 52). The glass plate 52 can be readily formed into an array by means of forming electrodes in one glass plate 52, each electrode having a width corresponding to the size of a beam (about 200 $\mu$m). The set consisting of the liquid crystal 53 and the transparent electrodes 55*a*, 55*b* may be provided for each input port so as to be common to the ordinary beam 41 and the extraordinary beam 42.

As mentioned above, the variable optical attenuator array compatible with multiple channels (12 channels) can be implemented in the form of a compact, inexpensive variable optical attenuator array while inhibiting an increase in the size of the array and the area occupied by the same, which would otherwise be caused by an increase in the number of channels. Even when the number of channels has been increased, the attenuator can be collectively configured by forming individual members into an array. Hence, the price of the optical attenuator array per channel can be significantly reduced when compared with the related-art optical attenuator array.

In particular, the variable optical attenuator is formed as a single piece by arranging the fiber block 2, the lens block 3, the birefringent crystal 4, the liquid-crystal element 5, and the reflection element 6 without any space therebetween. When compared with a related-art attenuator using, e.g., a Faraday rotary, the optical attenuator of the invention can be miniaturized significantly.

Figure 9A:
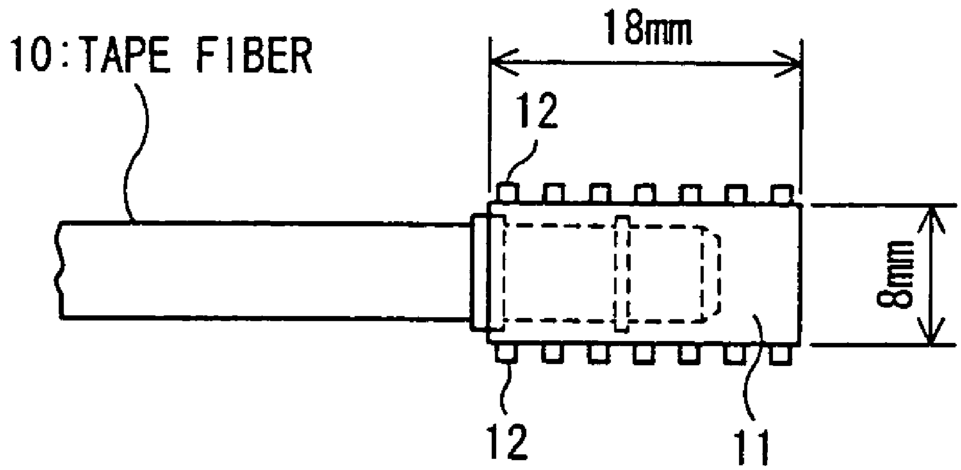
FIG. 9A is a schematic top view showing an example overview of a variable optical attenuator array of the embodiment.
Figure 9B:
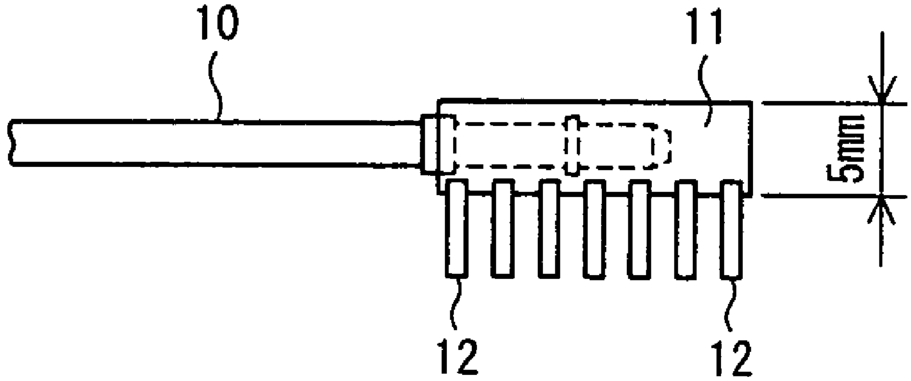
FIG. 9B is a schematic side view showing an example overview of a variable optical attenuator array of the embodiment.

FIGS. 9A and 9B show an example overview of a product of a variable optical attenuator array of the embodiment. FIG. 9A is a schematic top view showing an example overview of a product of a variable optical attenuator array of the embodiment, and FIG. 9B is a schematic side view showing an overview of the same product. As shown in FIGS. 9A and 9B, the variable optical attenuator array is constituted by the fiber block 2, the lens block 3, the birefringent crystal 4, the liquid-crystal element 5, and the reflection element 6, which are housed in a premolded package (housing) 11 (having a length of about 18 mm, a width of about 8 mm, and a thickness of about 5 mm) made of resin such as polyphenylenesulfide resin (PPS) or epoxy resin (alternatively, the housing may be made of metal). In FIGS. 9A and 9B, reference numeral 12 designates an electrical terminal, and a desired voltage is applied to the transparent electrodes 55*a*, 55*b* of the liquid-crystal element 5 by way of the electrical terminal 12.

If an optical system equivalent to that mentioned above can be achieved, reducing the gap between the lenses in the direction of the Y axis so as to become smaller than 250 $\mu$m presents no problem. As a matter of course, fixing of the tape fiber is not limited solely to use of an adhesive. In lieu of separate tape fibers being used for input and output purposes respectively, a commonly available fiber having 2×12 cores can be used for constituting the input/output optical system.

(A3) Description of a First Modification

Figure 10:
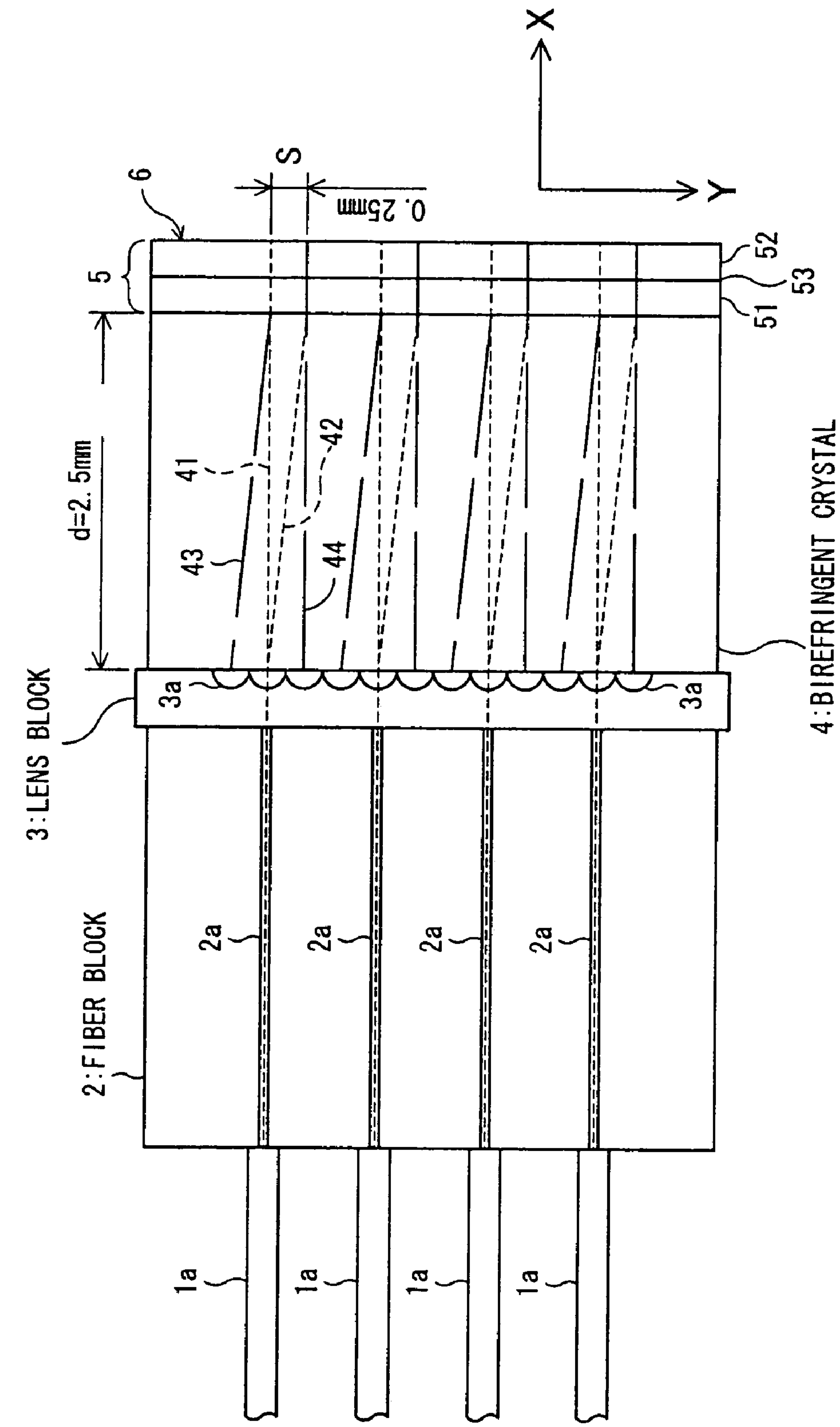
FIG. 10 is a schematic plan view showing a first modification of the variable optical attenuator array of the embodiment.

FIG. 10 is a schematic plan view showing a first modification of the previously-described variable optical attenuator array. In contrast with the variable optical attenuator shown in FIG. 8, in the variable optical attenuator shown in FIG. 10 the thickness of the birefringent crystal 4 (i.e., the length of the crystal in the direction of the X axis) is set to about 2.5 mm such that the distance S between the ordinary beam 41 and the extraordinary beam 42, having been divided by the reflection element 6, assumes a value of about 250 μm, and the pitch between the input ports 2*a* is set (to about 750 μm) so as to become greater than the pitch between the input lenses 3*a* (about 250 μm). Therefore, in the variable optical attenuator shown in FIG. 10, the number of input optical fibers 1*a* and the number of input ports 2*a* (i.e., the number of channels) are set to "4."

Although omitted from FIG. 10, the input optical fibers 1*a* and the output optical fibers 1*b* equal in number to the input ports 2*a* are arranged at a lower layer section of the fiber block 2 at the same pitch as that existing between the input optical fibers 1*a* and that existing between the input ports 2*a*, and the output lenses 3*b* equal in number to the input lenses 3*a* are provided in a lower layer section of the lens block 3 at the same pitch as that existing between the input lenses 3*a*.

As mentioned above, the pitch between the input optical fibers 1*a* and that existing between the output optical fibers 1*b* are set so as to become greater than the pitch existing between the input lenses 3*a* and that existing between the output lenses 3*b*. As a result, a large polarization extinction ratio can be ensured, thereby inhibiting occurrence of interference between adjacent ports (i.e., inter-channel interference).

Therefore, in this case, the liquid-crystal element 5 is given such a size (e.g., 0.5 mm in the direction of the Y axis and 2.5 mm in the direction of Z axis) that all ports can be covered with one set consisting of a piece of liquid crystal 53 and the transparent electrodes 55*a*, 55*b*. The degree of light attenuation in all channels (ports) can also be collectively controlled. Needless to say, it is better to provide the set consisting of the liquid crystal 53 and the transparent electrodes 55*a*, 55*b* for controlling channels (for each of the ordinary beam 41 and the extraordinary beam 42) separately, which arrangement can be expected to yield a great improvement in control accuracy and polarization extinction ratio.

Even in this embodiment, an optical fiber array (an integrated optical fiber) may be used for the input optical fibers 1*a* (output optical fibers 1*b*) and the input lenses 3*a* (output lenses 3*b*).

(A4) Description of a Second Modification

Figure 11:
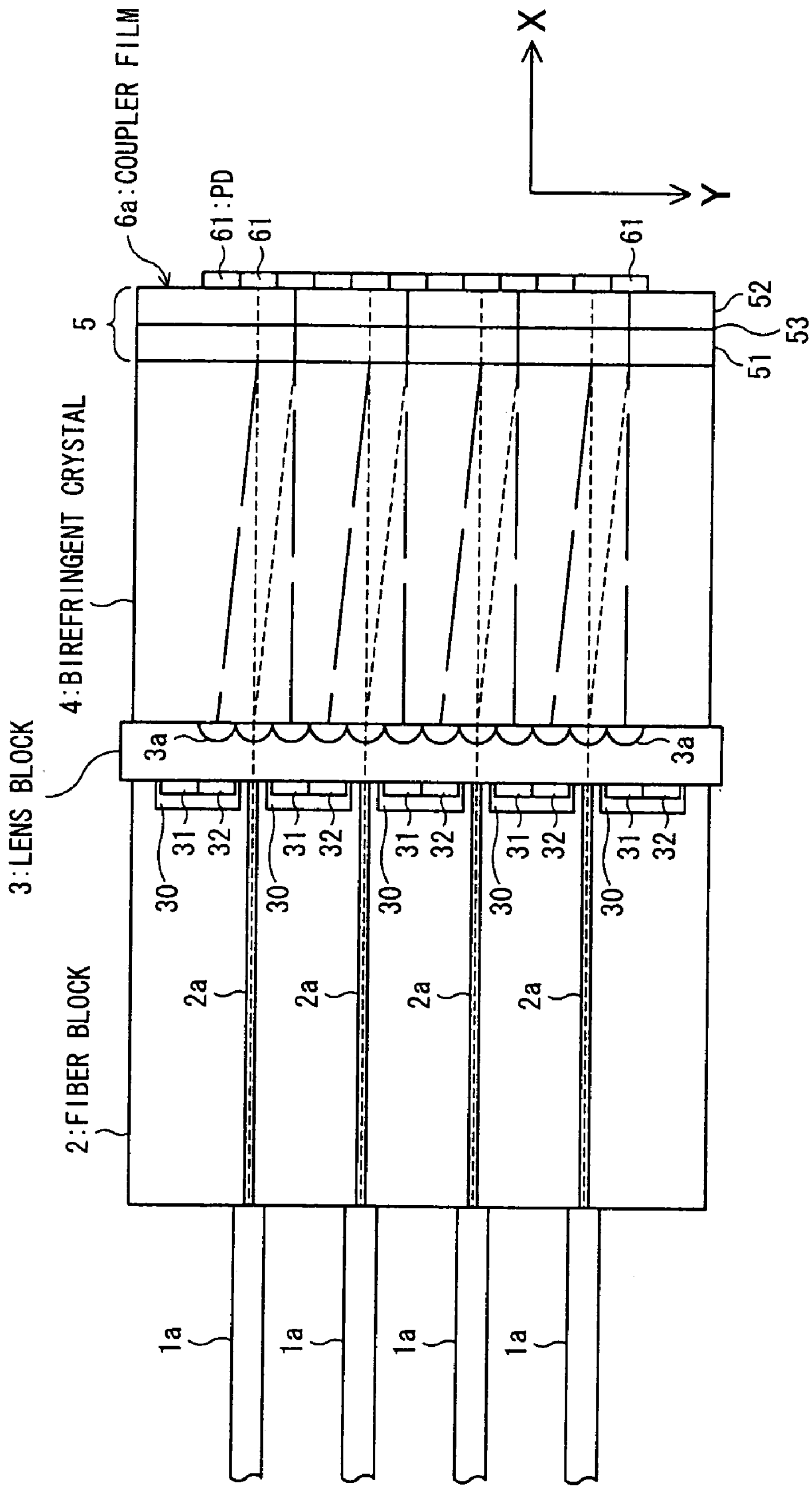
FIG. 11 is a schematic plan view showing a second modification of the variable optical attenuator array of the embodiment.

Next, FIG. 11 is a schematic plan view showing a second modification of the previously-described variable optical attenuator array. The variable optical attenuator shown in FIG. 11 is identical with that described by reference to FIG. 10. A difference between the variable optical attenuator of this embodiment and that shown in FIG. 10 lies in that the reflection element 6 is constituted not as a total reflection film but as a coupler film 6*a* for enabling passage of a portion of the incident light; that photodiodes (PD) 61 for monitoring light are arranged in an array in the direction of the Y axis at a position rearward of the coupler film 6*a*; and that PD blocks 30, each consisting of two light monitor PDs 31, 32, are provided on the surface of the lens block 3 opposing the fiber block 2 such that the PD blocks 30 are provided on both sides of each input port 2*a*.

The PDs (light-receiving sections) 61 situated rearward of the coupler film 6*a* are provided at least at positions where the beam exiting the liquid-crystal element 5 (or the ordinary beam 41 and the extraordinary beam 42 separated by the birefringent crystal 4) arrives at the coupler film 6*a*. Each of the PDs 61 can monitor the quantity of input light (i.e., the power of input light). The PDs 61 may be arranged individually as discrete components. However, in terms of a reduction in the number of components and a reduction in the number of man-hours for manufacturing, use of a PD device array—in which PDs are integrally arranged in an array in agreement with a pitch between the arrival positions—is preferable.

The pair of PDs (light-receiving sections) 31, 32 situated in front of the lens block 3 are provided for receiving beams which do not return to (or are not coupled to) the output port 2*b* from among the beams reflected from the coupler film 6*a*. Here, for example, the PD 31 is arranged so as to receive reflected light (output light) of the extraordinary beam 42 which is not coupled with the output port 2*b*. The remaining PD 32 is arranged so as to receive reflected light (output light) of the ordinary beam 41, which is not coupled to the output port 2*b*. Detailed configurations of the PDs 31, 32, and 62 will be described later.

Operation of the variable optical attenuator array having the foregoing configuration will now be described. The light exiting the input optical fiber 1*a* enters a corresponding input lens 3*a* by way of a corresponding input port 2*a*. The light is then converted into collimated light by means of the input lens 3*a*, and the thus-converted light enters the birefringent crystal 4. The birefringent crystal 4 separates the input light into the ordinary beam 41 and the extraordinary beam 42. The beams pass through the liquid-crystal element 5 and enter the coupler film 6*a*.

The beams having passed through the coupler film 6*a* (i.e., the ordinary beam 41 and the extraordinary beam 42) enter the PDs 61. A PD current for the ordinary beam 41 and a PD current for the extraordinary beam 42 are output. On the assumption that a PD current value pertaining to the ordinary beam 41 is taken as PD1 and a PD current value pertaining to the extraordinary beam 42 is taken as PD2, the sum of the two PD current values (i.e., the sum of light-receiving sensitivities=PD1+PD2) corresponds to the power of input light.

Of the beams reflected from the coupler film 6*a*, a beam having the same polarizing component as that of the incident light is coupled to the output port 2*b* by way of the birefringent crystal 4 in the manner mentioned previously. The beam that enters the birefringent crystal 4 as a result of polarizing components of the beam having been changed by the liquid-crystal element 5 is divided into an ordinary beam and an extraordinary beam as in the case of the beam traveling forward in the birefringent crystal. As a result, there arise a beam returning to the output port 2*b* and beams 43, 44 which undergo birefringence, to thus travel beside both sides of the output ports 2*b* (i.e., positions separated from both sides of the output port 2*b* by 250 μm), and do not return to the output port 2*b*.

The beams 43, 44 are received by the PDs 31, 32, respectively. Here, provided that the PD current value of an ordinary beam is taken as PD3 and the PD current value of an extraordinary beam is taken as PD4, the sum of PD3 and PD4 (i.e., a PD output value) corresponds to the quantity of light which has not coupled with the output port 2*b*. Therefore, a value determined by subtracting the PD output value (i.e., the sum of PD3 and PD4) pertaining to the output light from the PD output value (i.e., the sum of PD1 and PD2) pertaining to the input light corresponds to the quantity of light attenuation.

By means of calculation of the PD output values, the power of input light and that of output light can be monitored. There can be realized a compact, inexpensive variable optical attenuator capable of incorporating an optical monitor function that is indispensable as an optical output variable component.

Use of a PD of back incidence type—which enables direct adhesion of the coupler film 6*a* and the lens array block 3 (or the birefringent crystal 4) as structures of the PDs 31, 32, and 61—is preferable. As a matter of course, a commonly-employed PD of front incidence type can also be used. However, in this case, a required space must be provided between the coupler film 6*a* and the light incidence surface of PDs, in view of convenience of wiring. For instance, an epoxy-based optical adhesive is preferable for fixing PDs.

A preferable light-receiving diameter of the PDs 31, 32, and 61 is, e.g., 300 μm, regardless of the types of PDs employed. In the case of a PD of front incidence type, a PD having a smaller light-receiving diameter can also be applied to the PDs by means of reducing the diameter of a beam through arrangement of lenses in the space.

(A5) Description of a Third Modification

Figure 12:
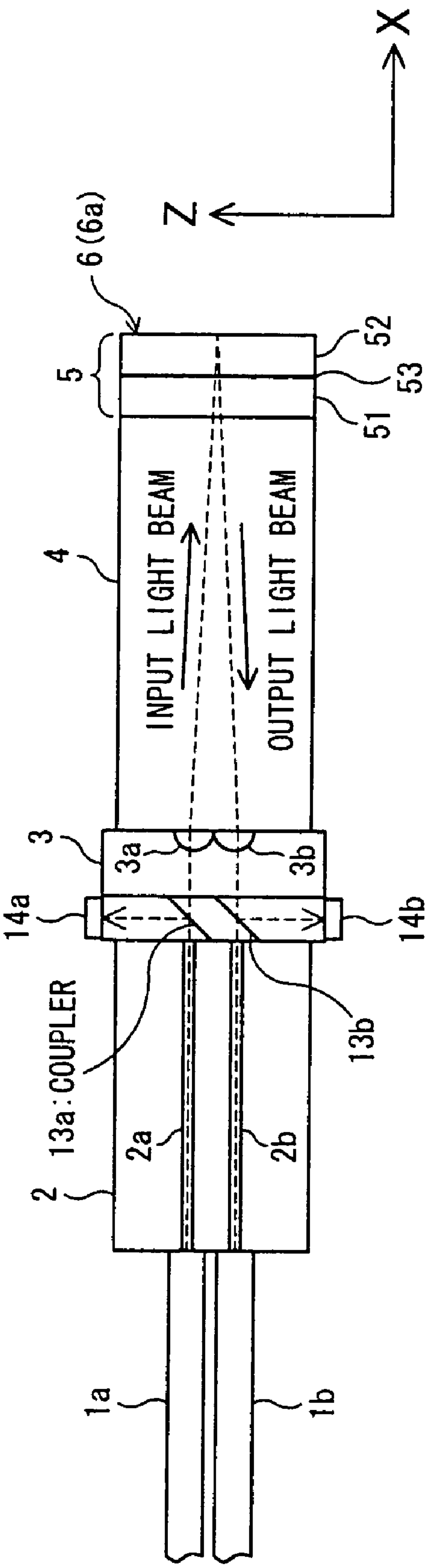
FIG. 12 is a schematic side view showing a third modification of the variable optical attenuator array of the embodiment.

FIG. 12 is a schematic side view showing a third modification of the previously-described variable optical attenuator array. The variable optical attenuator shown in FIG. 12 is identical with that shown in FIG. 10. A difference between the variable optical attenuator of this embodiment and that shown in FIG. 10 lies in that a prism (coupler film prism) 13 formed from sandwiched coupler films 13*a*, 13*b* is provided between the fiber block 2 and the lens block 3 such that input light and output light can be extracted in a direction orthogonal to the direction of the optical axis (i.e., the direction of the X axis); that PDs (input monitor PDs: light-receiving sections) 14*a* are provided on the upper surface of the prism 13 at positions corresponding to the respective input ports 2*a*; and that PDs (output monitor PDs: light-receiving sections) 14*b* are provided on a lower surface of the prism 13 at positions corresponding to the respective output ports 2*b*.

Here, the coupler films 13*a*, 13*b* have characteristics such that the film reflects a portion of incident light (e.g., 5% of incident light) in a direction orthogonal to the direction of the optical axis and that the film allows passage of the remaining portion (95%) through the coupler films in unmodified form. Consequently, the coupler film 13*a* reflects 5% of the light having entered by way of the input port 2*a*, to thereby cause the light to enter the PDs 14*a*, and allows passage of the remaining 95% of the light, to thereby cause the light to enter corresponding input lenses 3*a* of the lens block 3.

The coupler film 13*b* reflects 5% of the light exiting the output lens 3*b* of the lens block 3, to thereby cause the light to enter the PD 14*b* and allows passage of the remaining 95% of the light, to thereby cause the remaining light to enter corresponding output ports 2*b*. The thickness of the prism 13 (i.e., the length of the prism 13 in the direction of the X axis) is set to a value of, e.g., 500 μm. The transmission factor (a reflection factor) of the coupler films 13*a*, 13*b* can be changed, as required.

As a result, even the variable optical attenuator of the embodiment can also monitor the power of input light and the power of output light on a per-channel basis by means of the PDs 14*a*, 14*b*. Hence, the optical monitor function that is indispensable for a variable optical output component can be incorporated into the optical attenuator while an attempt is made to attain miniaturization and cost cutting.

The PDs 14*a*, 14*b* are also preferably formed by causing PDs of back incidence types to adhere directly to the surface of the coupler film prism 13. Use of an epoxy-based adhesive for fixing the PDs is preferable. As a matter of course, even in this case, a commonly-employed PD of front incidence type can also be used. In terms of convenience of wiring, there cannot be adopted a configuration in which the PDs are caused to adhere directly on the surface of the prism 13. Hence, a required space must be provided.

A preferable light-receiving diameter of the PDs 14*a*, 14*b* is, e.g., 300 μm, regardless of the types of PDs employed. In the case of a PD of front incidence type, a PD having a smaller light-receiving diameter can also be applied to the PDs by means of reducing the diameter of a beam through arrangement of lenses in the space. The PDs 14*a* (14*b*) may be provided on the prism 13 discretely. However, in terms of a reduction in the number of components and a reduction in the number of man-hours for manufacturing, use of a PD device array—in which PDs are integrally arranged in an array in agreement with a pitch between the input ports 2*a* (or output ports 2*b*)—is advantageous.

The previously-described embodiment adopts a pair consisting of the coupler film 13*a* and the input monitor PD 14*a* and another pair consisting of the coupler film 13*b* and the output monitor PD 14*b* so that input and output light can be extracted and monitored respectively. As a matter of course, it may be the case that only one of the pairs is adopted.

(A6) Connection Pattern of PDs

The configuration of the previously-described PD 61 and those of the PDs 31, 32, 14*a*, and 14*b* will be described in detail hereinbelow. For the sake of convenience of description, these PDs are not distinguished from each other and are denoted as PDs 20.

(A6.1) First configuration example of PD 20

Figure 13A:
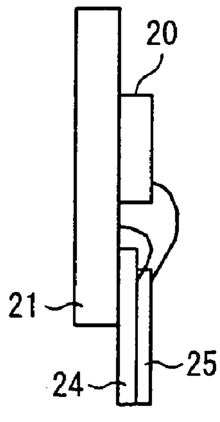
FIGS. 13A to 13C are views for describing a first configuration of a photodiode (PD) according to any of the embodiments.
Figure 13B:
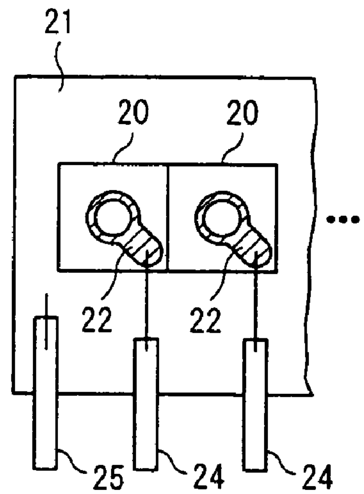
Figure 13C:
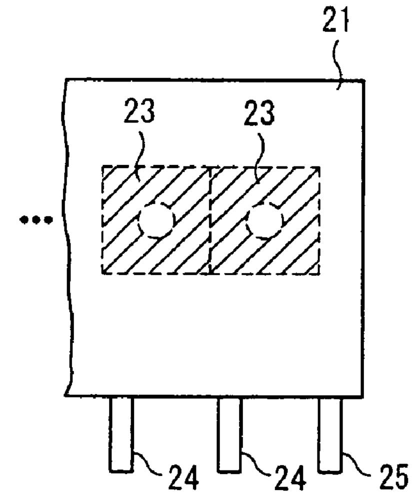

FIGS. 13A, 13B, and 13C are views for describing the first configuration example of the PD 20. FIG. 13A is a side view; FIG. 13B is a top view; and FIG. 13C is a view of the PD when observed through the back of FIG. 13B.

The respective PDs 20 shown in FIGS. 13A, 13B, and 13C are of back incidence type. In each of the PDs 20, a P electrode 22 is provided on one surface, and an N electrode 23 is provided on the other surface (light-receiving surface). The surface of the PD 20 provided with the N electrode 23 is taken as a mount surface, and the PDs 20 are arranged and fixed on the conductive transparent substrate 21, such as a transparent electrode, in the form of an array. P electrode terminals 24 are connected to the respective P electrodes 22, and a common terminal (N electrode common terminal) 25 is connected to the respective N electrodes 23 on the transparent substrate 21.

Adoption of such a structure obviates a necessity for providing N electrode terminals for the respective N electrodes 23, thereby curtailing the number of wires and achieving improved efficiency. Thus, an attempt can be made to pursue a more compact and lower-cost variable optical attenuator.

(A6.2) Second configuration example of PD 20

Figure 14A:
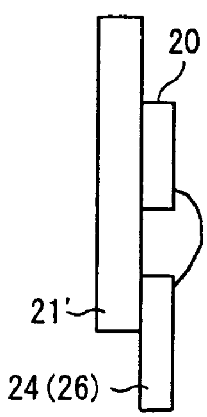
FIGS. 14A to 14C are views for describing a second configuration of a photodiode (PD) according to any of the embodiments.
Figure 14B:
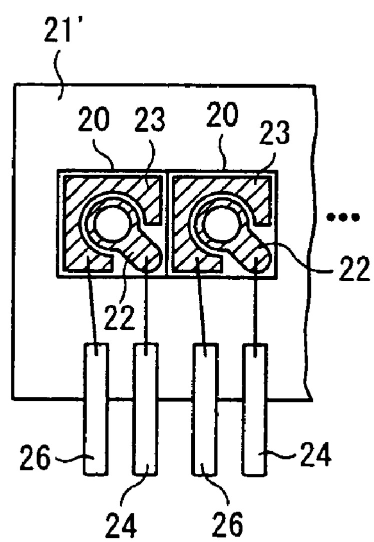
Figure 14C:
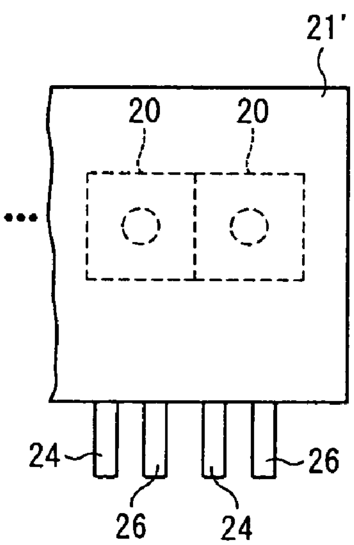

FIGS. 14A, 14B, and 14C are views for describing the second configuration example of the PD 20. FIG. 14A is a side view; FIG. 14B is a top view; and FIG. 14C is a view of the PD when observed through the back of FIG. 14B. The respective PDs 20 shown in FIGS. 14A, 14B, and 14C are also of back incidence type. In this case, the PD 20 has the following structure. Namely, one surface (light incidence surface) of the PD 20 is taken as a mount surface, and the PDs 20 are arranged on a transparent substrate 21' in the form of an array. The Pelectrode 22 connected to the P electrode terminal 24 and the N electrode terminal 26 provided around the P electrode terminal are provided on the other surface.

Here, the transparent substrate 21' may possess conductivity as in the case of the previously-described transparent substrate 20 or may be of non-conductive type. In this case, a limitation imposed on materials which can be used for the transparent substrate 21' is mitigated as compared with the first configuration example, thereby broadening the range of choice of materials. Therefore, an attempt can be made to curtail costs of the variable optical attenuator to a great extent through selection of material.

When such PDs 20 are provided, it is desirable to house the PDs 20 in the premolded package 11 (see FIGS. 9A and 9B) while sealing portions of the variable optical attenuator with resin so as to cover wire portions of the terminals 24 (or 25) and 26.

[B] Description of Second Embodiment

Although in the first embodiment the variable optical attenuator of reflection type is configured through use of the reflection element 6, the variable optical attenuator can also be configured without use of the reflection element 6 in the same manner as in the first embodiment.

Figure 15:
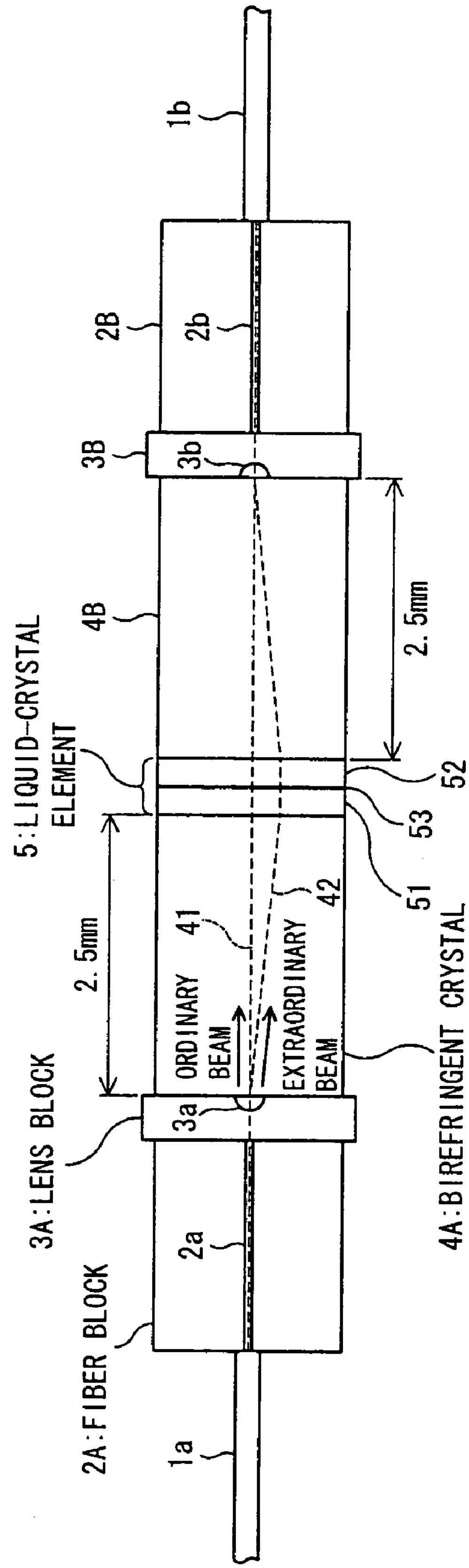
FIG. 15 is a schematic plan view showing the basic configuration of a variable optical attenuator employed as a second embodiment of the invention in conjunction with an optical path.
Figure 16A:
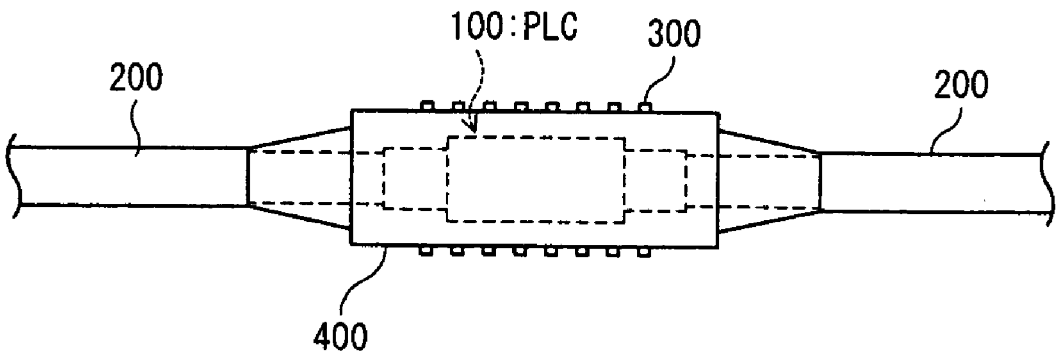
FIG. 16A is a schematic plan view showing the configuration of a variable optical attenuator using a related-art planar lightwave circuit (PLC)
Figure 16B:
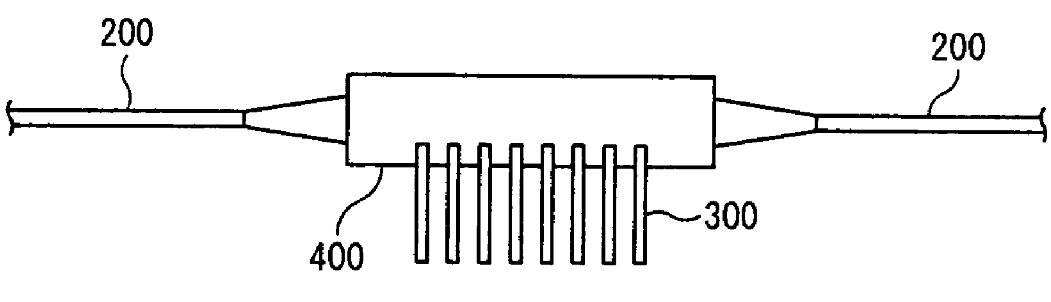
FIG. 16B is a schematic side view of the variable optical attenuator shown in FIG. 16A.

For instance, as shown in FIG. 15, a fiber (array) block (fiber-arrayed precision device) 2A, a lens (array) block (lens-arrayed precision device) 3A, and a birefringent crystal 4A are provided on an input side of the liquid-crystal element 5; and a fiber (array) block (fiber-arrayed precision device) 2B, a lens (array) block (lens-arrayed precision device) 3B, and a birefringent crystal 4B are provided on an output side of the liquid-crystal element 5 such that the fiber blocks, the lens blocks, and the birefringent crystals become symmetrical about the center of the liquid-crystal element 5. Even in such a case, the fiber blocks 2A, 2B, the lens blocks 3A, 3B, the birefringent crystals 4A, 4B, and the liquid-crystal element 5 are arranged in an integrated fashion without a space therebetween while light input surfaces or light output surfaces respectively remain in contact with each other.

Even in this embodiment, the input-side fiber block 2A is provided with input ports 2*a* which are provided for each input optical fiber 1*a* to be connected and cause the light exiting the input port 1*a* to propagate through the lens block 3A. Input lenses 3*a* arranged in agreement with the arrangement of the input ports 2*a* (in more detail, so as to coincide with optical axes of input light exiting the input ports 2*a*) are provided in the input-side lens block 3A.

The input-side birefringent crystal 4A and the output-side birefringent crystal 4B (i.e., the first and second refractive devices) are identical with or analogous to the birefringent crystal 4 of the first embodiment. The liquid-crystal element 5 is also identical with or analogous to that described in connection with the first embodiment.

Output lenses 3*b* arranged so as to coincide with optical axes of the input lenses 3*a* are provided in the output-side lens block 3B. Output ports 2*b*—which are arranged so as to coincide with optical axes of the input lenses 3*a* and cause the light exiting corresponding output lenses 3*b* to propagate to the output optical fibers 1*b*—are provided in the output-side fiber block 2B.

The configuration of this embodiment corresponds to a configuration in which the fiber block 2, the lens block 3, and the birefringent crystal 4, which are used in the input/output optical system in the first embodiment for both forward and backward directions, are provided separately for the input optical system (i.e., the fiber block 2A, the lens block 3A, and the birefringent crystal 4A) and the output optical system (i.e., the fiber block 2B, the lens block 3B, and the birefringent crystal 4B).

FIG. 15 shows only the pair of fibers 1*a*, 1*b*, the pair of ports 2*a*, 2*b*, and the pair of input lenses 3*a*, 3*b*. As a matter of course, those pairs are provided in equal number to required channels as in the case of, e.g., the embodiments shown in FIGS. 8 and 10.

Operation of the optical attenuator of the embodiment having the foregoing configuration will now be described. The light exiting the input optical fiber 1*a* enters the input lens 3*a* provided in the axial direction by way of the input port 2*a*. The light is then converted into collimated light by means of the input lens 3*a*, and the thus-converted light enters the input-side birefringent crystal 4A.

The light having entered the birefringent crystal 4A is divided into the ordinary beam 41 and the extraordinary beam 42, and the thus-divided beams enter the liquid-crystal element 5. Even in this embodiment, the liquid-crystal element 5 is equipped with the liquid crystal 53 and the transparent electrodes 55*a*, 55*b* for each beam, to thereby enable independent control of the beams. Hence, the polarizing state of the ordinary beam 41 and that of the extraordinary beam 42, both beams having entered the liquid crystal element 5, are individually controlled by the liquid crystal 53. Subsequently, the beams enter the output-side birefringent crystal 4B.

Of the beams having entered the birefringent crystal 4B, only the light components whose polarizing states coincide with the polarizing state of the light having entered the birefringent crystal 4A by way of the input lens 3 (i.e., forward-traveling light) are finally coupled to the output port 2*b* by way of the output lenses 3*b* and output to the output optical fibers 1*b*.

Therefore, even in this case, the quantity of light coupled to the output port 2*b* (output optical fibers 1*b*) can be freely changed on a per-channel basis by means of control of a voltage applied to the liquid-crystal element 5. Hence, the output power of light can be changed on a per-channel basis, and the variable optical attenuator can be realized at lower cost than can the conventional variable optical attenuator.

Even in this case, the fiber blocks 2A, 2B; the lens blocks 3A, 3B; the birefringent crystals 4A, 4B; and the liquid-crystal element 5 are arranged in an integrated fashion without a space therebetween while light input surfaces or light output surfaces remain in contact with each other. Hence, when compared with a related-art attenuator using, e.g., a Faraday rotary, the optical attenuator of the invention can be downsized significantly.

Even in this embodiment, there is no necessity for separate provision of the set consisting of the liquid crystal 53 and the transparent electrodes 55*a*, 55*b* for the ordinary beam 41 and the set for the extraordinary beam 42. The sets maybe provided in equal number to input beams before separation (i.e., the number of input ports) so as to be shared between the ordinary beam 41 and the extraordinary beam 42. When a polarization extinction ratio is improved by increasing the pitch between the ports, one set consisting of the liquid crystal 53 and the transparent electrodes 55*a*, 55*b* may cover the entire port.

As in the case of the embodiment described by reference to FIG. 12, a prism having a coupler film (i.e., a coupler film prism) may be provided so as to extract input and output beams in a direction orthogonal to the direction of the optical axis (i.e., the direction of the X axis), and monitor PDs for receiving the thus-extracted beams may also be provided. By means of such a configuration, even this embodiment enables monitoring of power of input and/or output light, and hence a light monitor function indispensable for a light output variation component can be incorporated into the optical attenuator.

Needless to say, the invention is not limited to the foregoing embodiments and can be implemented while being modified in various manners within the scope of the invention.

What is claimed is:

1. A variable optical attenuator comprising:

an input/output optical system to which are connected an input optical fiber and an output optical fiber and which has an input lens for taking light having entered by way of said input optical fiber as input light and an output lens for gathering output light to be coupled to said output optical fiber, to thereby couple said output light to said output optical fiber;

a birefringent device provided on an output side of said input/output optical system;

a liquid crystal device capable of changing polarizing states of said input light exiting said birefringent device; and a reflection device which reflects light passing through said liquid-crystal device so that the light returns to said output lens of said input/output optical system by way of said liquid-crystal device and said birefringent device, wherein said input/output optical system, said birefringent device, said liquid-crystal device, and said reflection device are integrated together.

2. The variable optical attenuator according to claim 1, wherein said input/output optical system comprises a fiber array block, in which a plurality of said input optical fibers are arranged and connected in the form of an array and a plurality of said output optical fibers are arranged and connected in the form of an array in the same direction as that in which the input optical fibers are arranged; and a lens array block, in which a plurality of said input lenses are arranged in the form of an array in accordance with the arrangement of said input optical fibers in said input array fiber block and in which a plurality of said output lenses are arranged in the form of an array in accordance with the arrangement of said output optical fibers in said output array fiber block.

3. The variable optical attenuator according to claim 2, wherein a pitch between said input optical fibers and a pitch between said output optical fibers are set so as to become greater than a pitch between said input lenses and a pitch between said output lenses.

4. The variable optical attenuator according to claim 2, wherein said input/output optical system has a prism unit which is interposed between said fiber array block and said lens array block and which reflects a portion of incident light in a direction crossing the direction of an optical axis; and a light-receiving unit for monitoring input and output light which receives the light reflected from said prism unit.

5. The variable optical attenuator according to claim 4, wherein said light-receiving unit is formed from a photodiode array, in which a plurality of photodiodes, each photodiode having a P electrode on one surface thereof and an N electrode on the other surface thereof, are arranged in an array pattern on a conductive transparent substrate such that said other surfaces come into contact with said transparent substrate; and wherein a common terminal of said N electrodes of said respective photodiodes are provided on said transparent substrate.

6. The variable optical attenuator according to claim 4, wherein said light-receiving unit is formed from a photodiode array, in which a plurality of photodiodes, each having a P electrode on one surface thereof and an N electrode formed around said P electrodes, are arranged in the form of an array on a transparent substrate.

7. The variable optical attenuator according to claim 2 wherein said input/output optical system has a prism unit which is interposed between said fiber array block and said lens array block and which reflects a portion of incident light in a direction crossing the direction of an optical axis; and a light-receiving unit for monitoring input and output light which receives the light reflected from said prism unit.

8. The variable optical attenuator according to claim 7, wherein said light-receiving unit is formed from a photodiode array, in which a plurality of photodiodes, each photodiode having a P electrode on one surface thereof and an N electrode on the other surface thereof, are arranged in an array pattern on a conductive transparent substrate such that said other surfaces come into contact with said transparent substrate; and wherein a common terminal of said N electrodes of said respective photodiodes is provided on said transparent substrate.

9. The variable optical attenuator according to claim 7, wherein said light-receiving unit is formed from a photodiode array, in which a plurality of photodiodes, each having a P electrode on one surface thereof and an N electrode formed around said P electrode, are arranged in the form of an array on a transparent substrate.

10. The variable optical attenuator according to claim 1, wherein said reflection device is formed from a coupler film which permits transmission of a portion of the light exiting the liquid-crystal device; and an input light monitor light-receiving unit for receiving the light having passed through said coupler film is provided on the surface of said coupler film.

11. The variable optical attenuator according to claim 10, wherein said light-receiving unit is formed from a photodiode array, in which a plurality of photodiodes, each photodiode having a P electrode on one surface thereof and an N electrode on the other surface thereof, are arranged in an array pattern on a conductive transparent substrate such that said other surfaces come into contact with said transparent substrate; and wherein a common terminal of said N electrodes of said respective photodiodes is provided on said transparent substrate.

12. The variable optical attenuator according to claim 10, wherein said light-receiving unit is formed from a photodiode array, in which a plurality of photodiodes, each having a P electrode on one surface thereof and an N electrode formed around said P electrode, are arranged in the form of an array on a transparent substrate.

13. The variable optical attenuator according to claim 1, wherein said input/output optical system is provided with an output light monitor light-receiving unit for receiving the light that is not coupled to said output optical fiber as a result of a variation in the polarizing state of said liquid-crystal device from the light reflected from said reflection device.

14. The variable optical attenuator according to claim 13, wherein said light-receiving unit is formed from a photodiode array, in which a plurality of photodiodes, each photodiode having a P electrode on one surface thereof and an N electrode on the other surface thereof, are arranged in an array pattern on a conductive transparent substrate such that said other surfaces come into contact with said transparent substrate; and wherein a common terminal of said N electrodes of said respective photodiodes is provided on said transparent substrate.

15. The variable optical attenuator according to claim 9, wherein said light-receiving unit is formed from a photodiode array, in which a plurality of photodiodes, each having a P electrode on one surface thereof and an N electrode formed around said P electrode, are arranged in the form of an array on a transparent substrate.

16. The variable optical attenuator according to claim 1, wherein said liquid-crystal device has a plurality of sets, each set comprising liquid crystal and electrodes to be used for applying an electric field to said liquid crystal, for controlling a polarizing state of said liquid-crystal device for light exiting said input optical fiber.

17. The variable optical attenuator according to claim 1, wherein said liquid-crystal device has a plurality of sets, each set comprising liquid crystal and electrodes to be used for applying an electric field to said liquid crystal, for controlling polarizing states of the liquid-crystal device for different respective polarizing components of said input light separated by said birefringent device.

18. The variable optical attenuator according to claim 1, wherein said liquid-crystal device is formed from liquid-crystal molecules and glass plates to be used for sandwiching said liquid-crystal molecules, and said reflection device is formed on the surface of one of said glass plates.

19. A variable optical attenuator comprising:

an input optical system to which an input optical fiber is connected and which has an input lens that take light exiting said input optical fiber as input light;

a first birefringent device provided on an output side of said input optical system;

a liquid-crystal device capable of varying the polarizing states of the input light exiting said first birefringent device;

a second birefringent device provided on an output side of said liquid-crystal device; and an output optical system to which an output optical fiber is connected and which has an output lens for gathering output light exiting said second birefringent device and coupling the gathered output light to an output optical fiber, wherein said input optical system, said first liquid-crystal device, said liquid-crystal device, said second birefringent device, and said output optical system are integrated together.

20. The variable optical attenuator according to claim 19, wherein said input optical system comprises an input fiber array block in which a plurality of said input optical fibers are arranged and connected in the form of an array; and an input lens array block in which a plurality of said input lenses are arranged in the form of an array according to the arrangement of said input optical fibers provided in said input fiber array block; and wherein said output optical system comprises an output fiber array block in which a plurality of said output optical fibers are arranged and connected in the form of an array; and an output lens array block in which a plurality of said output lenses are arranged in the form of an array according to the arrangement of said output optical fibers provided in said output fiber array block.

21. The variable optical attenuator according to claim 19, wherein said liquid-crystal device has a plurality of sets, each set comprising liquid crystal and electrodes to be used for applying an electric field to said liquid crystal, for controlling a polarizing state of light exiting from said input optical fiber.

22. The variable optical attenuator according to claim 19, wherein said liquid-crystal device has a plurality of sets, each set comprising liquid crystal and electrodes to be used for applying an electric field to said liquid crystal, for controlling polarizing states of different polarizing components of said input light separated by said first birefringent device on a per-polarizing-component basis.

23. A variable optical attenuator comprising:

an input/output optical system to which are connected an input optical fiber and a an output optical fiber and which has an input lens for taking light having entered by way of said input optical fiber as input light and an output lens for gathering output light to be coupled to said output optical fiber, to thereby couple said output light to said output/optical fiber;

a birefringent device provided on an output side of said input/output optical system;

a liquid crystal device capable of changing polarizing states of said input light exiting said birefringent device; and a reflection device which reflects light passing through said liquid-crystal device so that the light returns to said output lens of said input/output optical system by way of said liquid-crystal device and said birefringent device, wherein said input/output optical system comprises a fiber array block, in which a plurality of said input optical fibers are arranged and connected in the form of an array and a plurality of said output optical fibers are arranged and connected in the form of an array in the same direction as that in which the input optical fibers are arranged, a lens array block, in which a plurality of said input lenses are arranged in the form of an array in accordance with the arrangement of said input optical fibers in said input array fiber block and in which a plurality of said output lenses are arranged in the form of an array in accordance with the arrangement of said output optical fibers in said output array fiber block, a prism unit which is interposed between said fiber array block and said lens array block and which reflects a portion of incident light in a direction crossing the direction of an optical axis, and a light-receiving unit for monitoring input and output light which receives the light reflected from said prism unit.

24. The variable optical attenuator according to claim 23, wherein said light-receiving unit is formed from a photodiode array, in which a plurality of photodiodes, each photodiode having a P electrode on one surface thereof and an N electrode on the other surface thereof, are arranged in an array pattern on a conductive transparent substrate such that said other surfaces come into contact with said transparent substrate; and wherein a common terminal of said N electrodes of said respective photodiodes is provided on said transparent substrate.

25. The variable optical attenuator according to claim 23, wherein said light-receiving unit is formed from a photodiode array, in which a plurality of photodiodes, each having a P electrode on one surface thereof and an N electrode formed around said P electrode, are arranged in the form of an array on a transparent substrate.

26. A variable optical attenuator comprising:

an input/output optical system to which are connected an input optical fiber and an output optical fiber and which has an input lens for taking light having entered by way of said input optical fiber as input light and an output lens for gathering output light to be coupled to said output optical fiber, to thereby couple said output light to said output optical fiber;

a birefringent device provided on an output side of said input/output optical system;

a liquid crystal device capable of changing polarizing states of said input light exiting said birefringent device; and a reflection device which reflects light passing through said liquid-crystal device so that the light returns to said output lens of said input/output optical system by way of said liquid-crystal device and said birefringent device, wherein said reflection device is formed from a coupler film which permits transmission of a portion of the light exiting the liquid-crystal device, and an input light monitor light-receiving unit for receiving the light having passed through said coupler film is provided on the surface of said coupler film.

27. The variable optical attenuator according to claim 26, wherein said light-receiving unit is formed from a photodiode array, in which a plurality of photodiodes, each photodiode having a P electrode on one surface thereof and an N electrode on the other surface thereof, are arranged in an array pattern on a conductive transparent substrate such that said other surfaces come into contact with said transparent substrate; and wherein a common terminal of said N electrodes of said respective photodiodes is provided on said transparent substrate.

28. The variable optical attenuator according to claim 26, wherein said light-receiving unit is formed from a photodiode array, in which a plurality of photodiodes, each having a P electrode on one surface thereof and an N electrode formed around said P electrode, are arranged in the form of an array on a transparent substrate.

29. A variable optical attenuator comprising:

an input/output optical system to which are connected an input optical fiber and an output optical fiber and which has an input lens for taking light having entered by way of said input optical fiber as input light and an output lens for gathering output light to be coupled to said output optical fiber, to thereby couple said output light to said output optical fiber;

a birefringent device provided on an output side of said input/output optical system;

a liquid crystal device capable of changing polarizing states of said input light exiting said birefringent device; and a reflection device which reflects light passing through said liquid-crystal device so that the light returns to said output lens of said input/output optical system by way of said liquid-crystal device and said birefringent device, wherein said input/output optical system is provided with an output light monitor light-receiving unit for receiving the light that is not coupled to said output optical fiber as a result of a variation in the polarizing state of said liquid-crystal device from the light reflected from said reflection device.

30. The variable optical attenuator according to claim 29, wherein said light-receiving unit is formed from a photodiode array, in which a plurality of photodiodes, each photodiode having a P electrode on one surface thereof and an N electrode on the other surface thereof, are arranged in an array pattern on a conductive transparent substrate such that said other surfaces come into contact with said transparent substrate; and wherein a common terminal of said N electrodes of said respective photodiodes is provided on said transparent substrate.

31. The variable optical attenuator according to claim 25, wherein said light-receiving unit is formed from a photodiode array, in which a plurality of photodiodes, each having a P electrode on one surface thereof and an N electrode formed around said P electrode, are arranged in the form of an array on a transparent substrate.

32. A variable optical attenuator comprising:

an input/output optical system to which are connected an input optical fiber and an output optical fiber and which has an input lens for taking light having entered by way of said input optical fiber as input light and an output lens for gathering output light to be coupled to said output optical fiber, to thereby couple said output light to said output optical fiber;

a birefringent device provided on an output side of said input/output optical system;

a liquid crystal device capable of changing polarizing states of said input light exiting said birefringent device; and a reflection device which reflects light passing through said liquid-crystal device so that the light returns to said output lens of said input/output optical system by way of said liquid-crystal device and said birefringent device, wherein said liquid-crystal device is formed from liquid-crystal molecules and glass plates to be used for sandwiching said liquid-crystal molecules, and said reflection device is formed on the surface of one of said glass plates.

33. An apparatus comprising:

a birefringent device receiving an input light which propagates through the birefringent device and is thereby separated into polarized components which exit the birefringent device;

a liquid crystal device changing polarization states of the polarized components exiting the birefringent device, so that the polarized components having the changed polarization states exit the liquid crystal device as light output from the liquid crystal device; and a reflection device reflecting the light output from the liquid crystal device back to the liquid crystal device so that the reflect light passes through the liquid crystal device and the birefringent device and thereby exits the birefringent device; and an input/output optical system guiding the input light from an input fiber to the birefringent device and guiding the reflected light exiting the birefringent device to an output fiber so that the birefringent device, the liquid crystal device, the reflection device and the input/output optical system thereby operate together as a variable optical attenuator to attenuate the input light, wherein the birefringent device, the liquid crystal device, the reflection device and the input/output optical system are integrated together.

34. An apparatus comprising:

an input/output optical system;

a birefringent device;

a liquid crystal device; and a reflection device, wherein the input/output optical system, the birefringent device, the liquid crystal device, the reflection device are integrated together and arranged in order so that an input light is guided from an input fiber to the birefringent device by the input/output optical system, then passes through the birefringent device, then passes through the liquid crystal device and is then reflected by the reflection device so that the reflected light passes through the liquid crystal device and then through the birefringent device and is then guided from the birefringent device to an output fiber by the input/output optical system, the apparatus thereby operating as a variable optical attenuator.

* * * * *

UNITED STATES PATENT AND TRADEMARK OFFICE
CERTIFICATE OF CORRECTION

PATENT NO. : 6,978,076 B2
DATED : December 20, 2005
INVENTOR(S) : Toshiya Kishida et al.

It is certified that error appears in the above-identified patent and that said Letters Patent is hereby corrected as shown below:

Title page,
Item [56], References Cited, U.S. PATENT DOCUMENTS,
Delete "385/40" and insert -- 385/140 --.

Column 18,
Line 1, after "claim 2" insert -- , --.

Column 20,
Line 6, after "and" delete "a".
Line 11, delete "output/optical" and insert -- output optical --.

Signed and Sealed this

Thirtieth Day of May, 2006

JON W. DUDAS
*Director of the United States Patent and Trademark Office*